United States Patent
Hicks

(10) Patent No.: US 6,785,537 B2
(45) Date of Patent: Aug. 31, 2004

(54) MOBILE EQUIPMENT THEFT DETERRENT SYSTEM AND METHOD

(75) Inventor: Scott G. Hicks, Apex, NC (US)

(73) Assignee: Sony Ericsson Mobile Communications AB (SE)

(*) Notice: Subject to any disclaimer, the term of this patent is extended or adjusted under 35 U.S.C. 154(b) by 14 days.

(21) Appl. No.: 10/153,698

(22) Filed: May 22, 2002

(65) Prior Publication Data

US 2003/0220094 A1 Nov. 27, 2003

(51) Int. Cl.$^7$ .............................................. H04M 1/66
(52) U.S. Cl. ....................................... 455/410; 455/411
(58) Field of Search ................................. 455/410, 411, 455/557–558, 575, 414.1, 418–419, 575.6

(56) References Cited

U.S. PATENT DOCUMENTS

| | | | | |
|---|---|---|---|---|
| 5,444,764 A | * | 8/1995 | Galecki | 455/411 |
| 6,014,561 A | * | 1/2000 | Molne | 455/419 |
| 6,138,005 A | * | 10/2000 | Park | 455/411 |
| 6,148,192 A | * | 11/2000 | Ahvenainen | 455/410 |
| 6,259,908 B1 | * | 7/2001 | Austin | 455/411 |
| 6,263,214 B1 | * | 7/2001 | Yazaki et al. | 455/558 |
| 6,314,283 B1 | * | 11/2001 | Fielden | 455/411 |
| 6,393,270 B1 | * | 5/2002 | Austin | 455/411 |
| 6,415,144 B1 | * | 7/2002 | Findikli et al. | 455/419 |
| 6,445,914 B1 | * | 9/2002 | Findikli | 455/411 |
| 6,463,300 B1 | * | 10/2002 | Oshima | 455/558 |
| 6,484,026 B1 | * | 11/2002 | Hagebarth | 455/419 |

* cited by examiner

Primary Examiner—William Trost
Assistant Examiner—Brandon Miller
(74) Attorney, Agent, or Firm—Moore & Van Allen PLLC; Gregory A. Stephens

(57) ABSTRACT

A system and method for preventing the unauthorized use of improperly obtained mobile equipment is disclosed. The mobile equipment includes a plurality of personalization categories that are programmable into the mobile equipment by the manufacturer. Prior to purchase and at the request of the network provider, at least one of the personalization categories in addition to the network personalization category is enabled in the mobile equipment by the manufacturer. Upon powering up the mobile equipment for the first time, a personalization check is performed for the plurality of personalization categories. The personalization check is destined to fail with respect to one of the personalization categories other than the network personalization category. At this point, the person attempting to activate the mobile equipment is prompted for the authorization code for the personalization category that failed. The authorization code for the personalization category that failed is obtained from the network operator once the network operator is satisfied that the mobile equipment was not improperly obtained. The person attempting to activate the mobile equipment inputs the proper authorization code for the personalization category that failed in order to disable that personalization category. Once the personalization category is disabled, the mobile equipment can function on the intended network.

9 Claims, 2 Drawing Sheets

MOBILE EQUIPMENT THEFT DETERRENT SYSTEM AND METHOD

BACKGROUND OF THE INVENTION

Some mobile equipment (ME) requires the use of an associated subscriber identity module (SIM) card in order to operate. Without taking any precautions however, this type of mobile equipment can operate in any network that supports the mobile equipment's frequency band(s) and air interface standard by inserting a SIM card from such a network into the mobile equipment. Thus, for instance, it may be possible for mobile equipment obtained from network operator A to be operated in network B by inserting a SIM card programmed to operate in network B.

This cross compatibility in and of itself is not negative. In fact, it is desirable because different mobile equipment manufacturers need not manufacture different equipment for each network operator. The manufacturer merely has to program software resident in the mobile equipment to operate in conjunction with a SIM card that contains specific network identification data. The SIM card can then be inserted into the mobile equipment and initialized for use in a particular network.

Mobile telephony network operators heavily subsidize the cost of mobile equipment for their subscribers. Typically, a network operator will purchase a large quantity of mobile equipment from one or more manufacturers. The equipment is then sold to an end user along with a service contract. The goal is to recoup the subsidy through the service contract.

A problem arises if mobile equipment is lost or stolen after it is purchased from the manufacturer but before it is received by the network operator. Even after the equipment is received by the network operator it may be lost or stolen before being properly sold or distributed. This mobile equipment can be used in the intended network by inserting a SIM card from the intended network. Thus, the network operator has, in effect, subsidized the cost of the lost or stolen mobile equipment for use in their own network. The mobile equipment can not be used in another network since, at the time of manufacture, it was pre-programmed for a particular network using network personalization (described later).

What is needed is a system and method of preventing the use of mobile equipment in a network in cases where the mobile equipment was not properly purchased or otherwise properly obtained from the network operator.

BRIEF SUMMARY OF THE INVENTION

The present invention is a theft deterrent system and method that is intended to prevent the use of mobile equipment in a cellular telephony network in cases where the mobile equipment was not properly purchased or otherwise properly obtained from the network operator.

The mobile equipment includes a plurality of personalization categories that are programmable into the mobile equipment by the manufacturer at the time of manufacture. The typical personalization categories include network personalization, network subset personalization, service provider personalization, corporate personalization, and SIM card personalization. Prior to purchase, at least one of the personalization categories in addition to the network personalization category is enabled in the mobile equipment by the manufacturer at the request of the network provider. Upon powering up the mobile equipment for the first time, a personalization check is performed for the plurality of personalization categories. The personalization check is destined to fail with respect to one of the personalization categories other than the network personalization category. At this point, the person attempting to activate the mobile equipment is prompted for the authorization code for the personalization category that failed. The code for the personalization category that failed is obtained from the network operator once the network operator is satisfied that the mobile equipment was not improperly obtained. The person attempting to activate the mobile equipment inputs the proper authorization code for the personalization category that failed in order to disable that personalization category. Once the personalization category is disabled, the mobile equipment can function on the intended network.

DETAILED DESCRIPTION OF THE INVENTION

There are five personalization categories that a network operator can choose among when purchasing GSM mobile equipment from a manufacturer. The network operator can instruct the manufacturer to enable any of the personalization categories. The personalization categories, in no particular order, include network personalization, network subset personalization, service provider personalization, corporate personalization, and SIM personalization. Network personalization allows the network operator to personalize mobile equipment so that it may only be used with that particular network operator's SIM cards. Network subset personalization is a refinement of network personalization that allows network operators to limit the usage of mobile equipment to a subset of SIM cards. Service provider personalization allows a service provider to personalize mobile equipment so that it may only be used with that particular service provider's SIM cards. Corporate personalization allows a corporate customer to personalize mobile equipment for employees or customers so that the mobile equipment may only be used with the company's SIM cards. SIM personalization enables an end user to personalize their mobile equipment so that it may only be used with a particular SIM card.

There are five corresponding control keys (authorization codes) that toggle the aforementioned personalization categories "on" and "off". The control keys are termed NCK for network control key, NSCK for network subset control key, SPCK for service provider control key, CCK for corporate control key, and PCK for personalization control key. The control keys are randomly generated by the manufacturer and permanently associated with each piece of mobile equipment. In addition, the mobile equipment includes hardware and software protection mechanisms that prevent unauthorized disabling or enabling of the personalization categories. The purpose of the control keys is to allow an authorized person to enable or disable a particular personalization category. If one or more personalization categories have been enabled, then the mobile equipment will only function when a SIM card having matching personalization data is inserted into the mobile equipment.

The present invention addresses a situation in which purchased mobile equipment with network personalization enabled has been stolen before it is received by the purchasing network operator. In such a case, this equipment can still be operated in the network using a SIM card from the network even though the mobile equipment was improperly obtained. The mobile equipment cannot be operated in a different network, however, since network personalization has been enabled and a SIM card from another network will fail.

Figure 1:
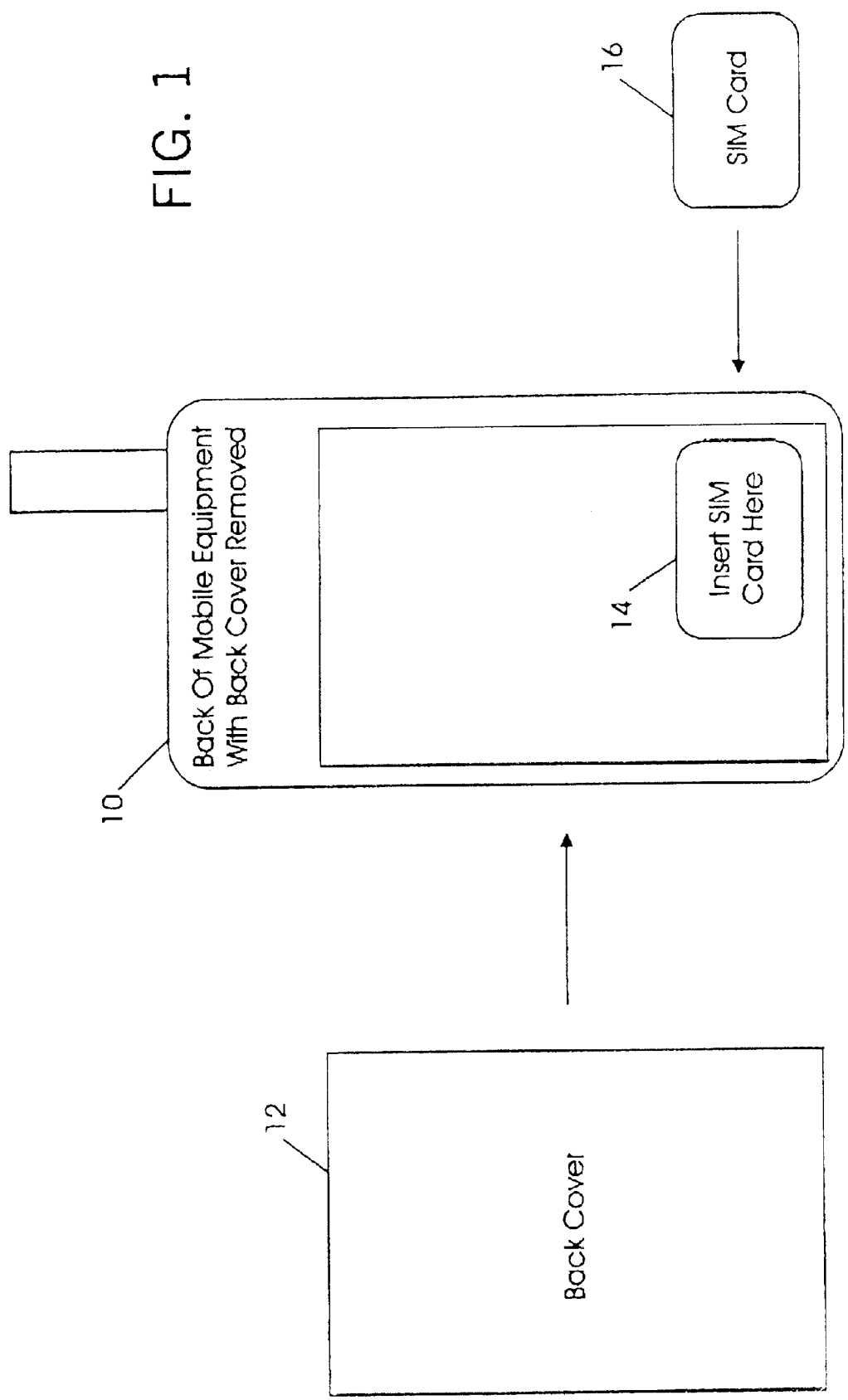
FIG. 1 illustrates the back of a mobile phone with its battery cover removed and an associated SIM card.

FIG. 1 illustrates a typical piece of GSM mobile equipment 10. The mobile equipment 10 is shown in a rear view with the back cover 12, usually the battery cover, removed. A space 14 is shown where a SIM card 16 would be inserted. Lastly, a SIM card 16 is illustrated. FIG. 1 illustrates the relationship and coupling of a piece of mobile equipment 10 and a SIM card 16.

Figure 2:
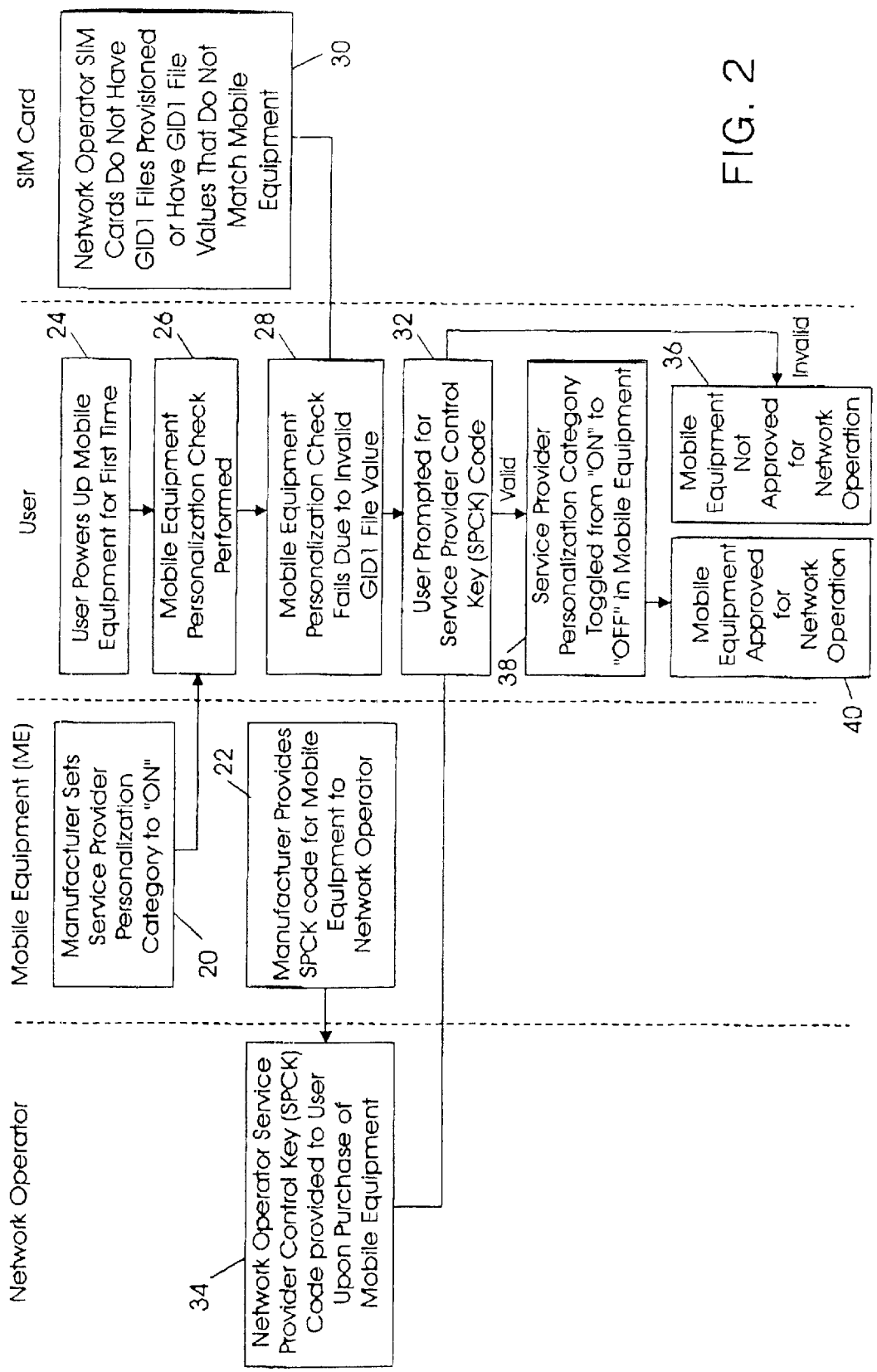
FIG. 2 illustrates a flowchart describing steps for implementing the present invention.

FIG. 2 illustrates a flowchart that details the steps that need to be performed by the various parties involved in getting a piece of mobile equipment enabled for a particular network. The process typically begins with a network operator placing an order with a mobile equipment manufacturer. The manufacturer obtains the requisite network identification data needed to enable the network personalization category for the purchasing network operator.

Most network operators do not use the service provider personalization or corporate personalization categories. As a result, the network operators do not provision their SIM cards for these categories. Specifically, the Group ID 1 (GID1) file pertaining to service provider personalization and the Group ID 2 (GID2) file pertaining to corporate personalization are not provisioned on the network operator's SIM cards. Moreover, the GID files residing on SIM cards are tamper resistant as well. GID files cannot be created or modified without SIM card administrative codes which are kept in confidence by the network operator. The present invention takes advantage of the non-enablement of one of these personalization categories. For illustrative purposes only this disclosure will be described in the context of the service provider personalization category.

When the network operator places an order for a quantity of mobile equipment, the network operator can specify that the manufacturer enable service provider personalization in addition to network personalization 20. Thus, the mobile equipment can not function in the network unless and until both categories have been validated. Network personalization will remain enabled on the mobile equipment and the SIM card must have a matching identifier. Service provider personalization, however, is initially enabled but is disabled via entry of the proper service provider control key (SPCK). Once service provider personalization is disabled it is never prompted for again and becomes moot.

The manufacturer ships the mobile equipment to the network operator and separately informs the network operator of the randomly generated SPCK codes 22 for each piece of mobile equipment. The SPCK authorization codes are needed to disable service provider personalization.

When a user obtains mobile equipment and attempts to get the mobile equipment up and running on the network a series of steps must be performed. The user powers up the mobile equipment for the first time 24. Upon powering up, the mobile equipment performs a series of personalization checks 26 including the network, network subset, service provider, corporate, and SIM personalization checks. In this case, the network and service provider personalization categories are enabled and the other categories are disabled. With respect to the network personalization category, the mobile compares the data programmed into the mobile equipment with the data programmed into the SIM card. If a match occurs then the mobile is approved for use on the network. Since the service provider personalization is also enabled, the mobile equipment cannot be used on the network until service provider personalization is disabled.

The service provider personalization check will fail 28 because the SIM card will either have a non provisioned GID1 file or a wrongly provisioned GID1 file 30. At this point, the only way to allow the mobile equipment to operate on the network is to disable service provider personalization. This can only be done by entering the proper SPCK code. The user is prompted for the SPCK code 32. The user receives a valid SPCK code from the network operator 34 upon satisfaction that the mobile equipment was properly obtained. The user then enters the SPCK code. If it is invalid then the mobile equipment will not be approved for use on the network 36. If the SPCK code is valid, then service provider personalization is disabled 38 regardless of the GID1 file values on the SIM card. Once service provider personalization is disabled, the mobile equipment is approved for use on the network 40.

Users attempting to activate mobile equipment that has been improperly obtained will not have access to the SPCK authorization codes and will be unable to activate the mobile equipment on a network.

This disclosure has been described using the service provider personalization category because that is a category that is typically unused by network operators when specifying orders with a manufacturer. The corporate personalization category is another category that is typically unused by network operators. Thus, the service provider personalization data may be substituted with corporate personalization data within the foregoing description and the present invention will function in the exact same manner.

Moreover, this disclosure has been described with respect to GSM mobile equipment because GSM network operators utilize SIM cards. One of ordinary skill in the art would readily recognize that the methods of the present invention apply to any mobile equipment that utilizes a SIM card, or the like, to function. In fact, some CDMA networks now use SIM cards for their mobile equipment. Other air interface standards may or will adopt SIM card usage on a widespread basis and the present invention is intended to cover such cases.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the receitation "means for", are not intended to be read as means-plus-function elements, even if the claim otherwise includes the word "means".

What is claimed is:

1. A method of preventing the unauthorized use of mobile equipment that utilizes a SIM card, wherein the mobile equipment includes a plurality of personalization categories that are programmable into the mobile equipment by the manufacturer wherein at least one of the personalization categories other than a network personalization category has been enabled by the manufacturer, the method comprising:

performing a personalization check for the plurality of personalization categories upon powering up the mobile equipment for the first time;

intentionally failing the personalization check with respect to one of the personalization categories because the SIM card data does not match the expected value for that personalization category;

prompting for an authorization code for the personalization category that failed; and inputting the proper authorization code for the personalization category that failed in order to disable that personalization category.

2. The method of claim 1 wherein the personalization category that fails the personalization check is the service provider personalization category.

3. The method of claim 1 wherein the personalization category that fails the personalization check is the corporate personalization category.

4. The method of claim 1 wherein the proper authorization code for the personalization category that failed is obtained from the network operator once the network operator is satisfied that the mobile equipment was not improperly obtained.

5. A system of preventing the unauthorized use of mobile equipment that utilizes a SIM card, wherein the mobile equipment includes a plurality of personalization categories that are programmable into the mobile equipment by the manufacturer wherein at least one of the personalization categories other than a network personalization category has been enabled by the manufacturer, the system comprising:

means for performing a personalization check for the plurality of personalization categories upon powering up the mobile equipment for the first time;

means for prompting for an authorization code for any personalization category that intentionally failed because the SIM card data did not match the expected value for that personalization category; and means for inputting an authorization code for the personalization category that failed in order to disable that personalization category.

6. The system of claim 5 wherein the authorization code for the personalization category that failed is obtained from the network operator once the network operator is satisfied that the mobile equipment was not improperly obtained.

7. The system of claim 5 wherein the personalization category that fails the personalization check is the service provider personalization category.

8. The system of claim 5 wherein the personalization category that fails the personalization check is the corporate personalization category.

9. A theft deterrent mechanism for SIM card compatible mobile equipment comprising:

a plurality of programmable personalization categories resident within the mobile equipment wherein at least one of the personalization categories, other than a network personalization category, has been enabled by the mobile equipment manufacturer; and a mobile equipment processor that:

performs a personalization check on each of the plurality of personalization categories upon powering up the mobile equipment for the first time;

prompts for an authorization code for any personalization category that intentionally failed a personalization check because the SIM card data did not match the expected value for that personalization category; and accepts an authorization code for the personalization category that failed in order to disable that personalization category.

* * * * *